(12) United States Patent
Zemborain et al.

(10) Patent No.: US 12,123,602 B2
(45) Date of Patent: Oct. 22, 2024

(54) AIR-CONDITIONER WITH FLUID TANK

(71) Applicant: Electrolux Appliances Aktiebolag, Stockholm (SE)

(72) Inventors: Pedro Zemborain, Stockholm (SE); Artur Daugela, Stockholm (SE)

(73) Assignee: Electrolux Appliances Aktiebolag, Stockholm (SE)

( * ) Notice: Subject to any disclaimer, the term of this patent is extended or adjusted under 35 U.S.C. 154(b) by 331 days.

(21) Appl. No.: 17/781,527

(22) PCT Filed: Dec. 4, 2019

(86) PCT No.: PCT/EP2019/083588
§ 371 (c)(1),
(2) Date: Jun. 1, 2022

(87) PCT Pub. No.: WO2021/110251
PCT Pub. Date: Jun. 10, 2021

(65) Prior Publication Data
US 2023/0003396 A1    Jan. 5, 2023

(51) Int. Cl.
*F24F 1/0003*    (2019.01)
*F16L 55/09*    (2006.01)
*F24F 1/32*    (2011.01)

(52) U.S. Cl.
CPC ............. *F24F 1/0003* (2013.01); *F24F 1/32* (2013.01); *F16L 55/09* (2013.01)

(58) Field of Classification Search
CPC .......... F24F 1/32; F16L 55/09; F01P 11/0204; F01P 11/028; F01P 11/0285
See application file for complete search history.

(56) References Cited

U.S. PATENT DOCUMENTS

| | | |
|---|---|---|
| 339,491 A | 3/1889 | Bukawietis |
| 2,234,753 A | 10/1932 | Frazer |
| 1,954,017 A | 4/1934 | Manning |
| 2,268,451 A | 12/1941 | Hull |
| 2,320,436 A | 6/1943 | Hull |
| 2,436,713 A | 2/1948 | Cody |
| 2,568,968 A | 9/1951 | Perrin |

(Continued)

FOREIGN PATENT DOCUMENTS

| | | |
|---|---|---|
| CN | 2190590 Y | 3/1995 |
| CN | 2413205 Y | 1/2001 |

(Continued)

OTHER PUBLICATIONS

Final Office Action for U.S. Appl. No. 16/771,111, dated Mar. 10, 2023, 13 pages.

(Continued)

*Primary Examiner* — Christopher R Zerphey
(74) *Attorney, Agent, or Firm* — Bradley Arant Boult Cummings LLP

(57) ABSTRACT

An air-conditioner having a fluid tank configured to connect an indoor unit of the air-conditioner with an outdoor unit of the air-conditioner. The fluid tank comprises a first chamber, and a second chamber. The first chamber comprises a high-pressure inlet and a high-pressure outlet. The second chamber comprises a low-pressure inlet, a low-pressure outlet and a low-pressure filling opening.

20 Claims, 5 Drawing Sheets

(56) References Cited

U.S. PATENT DOCUMENTS

| | | |
|---|---|---|
| 2,608,148 A | 8/1952 | Shapiro |
| 2,708,833 A | 5/1955 | Nigro |
| 2,814,244 A | 11/1957 | Hord |
| 2,818,793 A | 1/1958 | Hord |
| 2,925,026 A | 2/1960 | Schuster et al. |
| 2,935,284 A | 5/1960 | Reeves |
| 3,030,873 A | 4/1962 | Metcalfe |
| 3,134,319 A | 5/1964 | Marsteller |
| 3,476,033 A | 11/1969 | Appel |
| 3,481,264 A | 12/1969 | Ulich |
| 3,491,549 A | 1/1970 | Oglesby |
| 3,552,470 A | 1/1971 | Metcalfe |
| 3,554,476 A | 1/1971 | Gaylor, Jr. |
| 3,698,308 A | 10/1972 | Navaro |
| 3,911,803 A | 10/1975 | Kong et al. |
| 4,086,886 A | 5/1978 | Edmaier et al. |
| 4,152,844 A | 5/1979 | Materniak et al. |
| 4,203,302 A | 5/1980 | Lapeyre |
| 4,334,461 A | 6/1982 | Ferguson et al. |
| 5,027,614 A | 7/1991 | Mori et al. |
| 5,139,082 A * | 8/1992 | McEachern, Jr. ...... F01P 11/028 165/104.32 |
| 5,167,131 A | 12/1992 | Karkhanis |
| 5,290,343 A | 3/1994 | Morita et al. |
| 5,365,992 A | 11/1994 | Swain et al. |
| 5,582,025 A | 12/1996 | Dubin et al. |
| 5,823,289 A | 10/1998 | Csomos |
| 5,979,172 A | 11/1999 | Teller |
| 5,979,533 A | 11/1999 | Dupuie |
| 6,173,930 B1 | 1/2001 | Arbucci |
| 6,216,646 B1 * | 4/2001 | Smith ...................... F01P 11/029 165/104.32 |
| 6,257,013 B1 | 7/2001 | Murray et al. |
| 6,321,554 B1 * | 11/2001 | Rigoni .................. F24F 1/0003 62/286 |
| 6,416,570 B2 | 7/2002 | Goto et al. |
| 6,568,201 B1 | 5/2003 | Cur et al. |
| 6,767,278 B1 | 7/2004 | Peterson |
| 6,782,926 B1 * | 8/2004 | Hughes ................... F01P 11/18 141/59 |
| 6,983,621 B2 | 1/2006 | Cur et al. |
| 7,121,105 B1 | 10/2006 | Rais |
| 7,296,424 B2 | 11/2007 | Thompson |
| 7,332,019 B2 | 2/2008 | Bias et al. |
| 7,350,759 B1 | 4/2008 | Gray |
| 7,601,204 B2 | 10/2009 | Woodruff et al. |
| 7,854,141 B1 | 10/2010 | Breen |
| 7,896,957 B2 | 3/2011 | Zhao et al. |
| 7,975,441 B2 | 7/2011 | McCarriston |
| 8,091,844 B1 | 1/2012 | Bragg |
| 8,104,240 B2 | 1/2012 | McCarriston |
| 8,578,728 B2 | 11/2013 | Cho et al. |
| 8,584,998 B1 | 11/2013 | Peterson |
| 9,163,854 B2 | 10/2015 | Arbucci |
| 9,179,794 B2 | 11/2015 | Darby |
| 9,303,895 B1 | 4/2016 | Grant |
| 9,447,916 B2 | 9/2016 | Darby et al. |
| D782,289 S | 3/2017 | Darby et al. |
| 9,605,870 B2 | 3/2017 | Darby et al. |
| 9,909,712 B1 | 3/2018 | Darby |
| 9,938,044 B2 | 4/2018 | Gamboa |
| 9,982,909 B1 | 5/2018 | Perez et al. |
| 10,077,918 B2 | 9/2018 | Darby et al. |
| 10,104,964 B2 | 10/2018 | Darby |
| 10,104,965 B1 | 10/2018 | Miller |
| 10,203,130 B2 | 2/2019 | Gardikis et al. |
| 10,203,180 B2 | 2/2019 | Miller et al. |
| 10,295,221 B2 | 5/2019 | Zhang |
| 10,359,212 B2 | 7/2019 | Darby |
| 10,401,043 B2 | 9/2019 | Li |
| 10,408,494 B2 | 9/2019 | Darby |
| 10,520,206 B2 | 12/2019 | Xu et al. |
| 10,775,054 B2 * | 9/2020 | Bradford ............... F24F 1/0003 |
| 10,900,689 B2 | 1/2021 | Weiner |
| 11,111,839 B2 * | 9/2021 | Ayva ........................ F01P 7/14 |
| 11,326,788 B2 * | 5/2022 | Sawada ..................... F24F 1/62 |
| 11,584,191 B2 * | 2/2023 | Potticary ................. F01P 7/165 |
| 11,691,477 B2 * | 7/2023 | Grouillet ................ B04C 5/103 55/315.2 |
| 11,808,522 B2 * | 11/2023 | Nishioka ............. F28D 1/05391 |
| 12,000,324 B2 * | 6/2024 | Bender ................. B60R 13/083 |
| 2001/0032545 A1 | 10/2001 | Goto et al. |
| 2003/0097854 A1 | 5/2003 | Cur et al. |
| 2003/0110789 A1 * | 6/2003 | Cur ......................... F24F 1/027 62/262 |
| 2005/0028545 A1 | 2/2005 | Herbert |
| 2006/0021359 A1 | 2/2006 | Hur et al. |
| 2006/0223434 A1 | 10/2006 | Barker |
| 2007/0023592 A1 | 2/2007 | Makaso |
| 2007/0068185 A1 | 3/2007 | Thompson |
| 2007/0137237 A1 | 6/2007 | Rais |
| 2008/0053309 A1 | 3/2008 | Woodruff et al. |
| 2008/0104989 A1 | 5/2008 | Movshovitz |
| 2010/0077924 A1 | 4/2010 | Zhao et al. |
| 2010/0197214 A1 | 8/2010 | Geremia et al. |
| 2010/0229585 A1 * | 9/2010 | Bradford ............... F24F 1/0003 62/324.4 |
| 2010/0326103 A1 | 12/2010 | Stamm et al. |
| 2012/0137499 A1 | 6/2012 | Agnihotri |
| 2012/0274188 A1 | 11/2012 | Shiborino |
| 2013/0104581 A1 * | 5/2013 | Consoli ................. F24F 5/0035 454/284 |
| 2013/0153744 A1 | 6/2013 | Jin et al. |
| 2013/0327509 A1 | 12/2013 | Michitsuji |
| 2014/0020421 A1 | 1/2014 | Gallo |
| 2014/0076506 A1 | 3/2014 | Olivas |
| 2014/0090334 A1 | 4/2014 | Darby et al. |
| 2014/0311063 A1 | 10/2014 | McIntyre |
| 2015/0034784 A1 | 2/2015 | Darby |
| 2015/0097096 A1 | 4/2015 | Arbucci |
| 2015/0211802 A1 | 7/2015 | Yokozeki et al. |
| 2015/0354838 A1 | 12/2015 | Cur et al. |
| 2016/0033166 A1 | 2/2016 | Herbert |
| 2016/0058189 A1 | 3/2016 | Darby |
| 2016/0097547 A1 | 4/2016 | Selg et al. |
| 2016/0298872 A1 | 10/2016 | Darby et al. |
| 2017/0153041 A1 | 6/2017 | Darby et al. |
| 2017/0159948 A1 | 6/2017 | Darby |
| 2017/0191763 A1 | 7/2017 | Xu et al. |
| 2017/0254557 A1 | 9/2017 | Chiu |
| 2017/0284683 A1 | 10/2017 | Gallo et al. |
| 2017/0297768 A1 | 10/2017 | Gamboa |
| 2017/0328596 A1 | 11/2017 | Darby |
| 2018/0023842 A1 | 1/2018 | Gardikis et al. |
| 2018/0180305 A1 | 6/2018 | Zhang |
| 2019/0056143 A1 | 2/2019 | Zhang |
| 2019/0063760 A1 | 2/2019 | Li |
| 2019/0212028 A1 | 7/2019 | Zemborain et al. |
| 2019/0212032 A1 | 7/2019 | Galvan |
| 2020/0124296 A1 | 4/2020 | Baumann et al. |
| 2020/0248911 A1 | 8/2020 | Lei et al. |
| 2020/0333021 A1 * | 10/2020 | Martinez Galvan ...... F24F 1/16 |
| 2020/0363075 A1 | 11/2020 | Bradford et al. |
| 2021/0010688 A1 | 1/2021 | Biasotti et al. |
| 2021/0078118 A1 | 3/2021 | Li et al. |
| 2021/0088251 A1 * | 3/2021 | Martinez Galvan .. F24F 1/0003 |
| 2021/0180828 A1 | 6/2021 | Xing et al. |
| 2021/0356146 A1 | 11/2021 | Zhang et al. |
| 2021/0404749 A1 | 12/2021 | Wexler et al. |

FOREIGN PATENT DOCUMENTS

| | | |
|---|---|---|
| CN | 1338593 A | 3/2002 |
| CN | 1445491 A | 10/2003 |
| CN | 1595005 A | 3/2005 |
| CN | 1727764 A | 2/2006 |
| CN | 201104001 Y | 8/2008 |
| CN | 201249077 Y | 6/2009 |
| CN | 101523120 A | 9/2009 |
| CN | 201589348 U | 9/2010 |
| CN | 103471223 A | 12/2013 |
| CN | 203379993 U | 1/2014 |
| CN | 203501389 U | 3/2014 |

(56) References Cited

FOREIGN PATENT DOCUMENTS

| | | |
|---|---|---|
| CN | 203518172 U | 4/2014 |
| CN | 104061632 A | 9/2014 |
| CN | 203980467 U | 12/2014 |
| CN | 204141751 U | 2/2015 |
| CN | 204153874 U | 2/2015 |
| CN | 204202053 U | 3/2015 |
| CN | 204491248 U | 7/2015 |
| CN | 205037425 U | 2/2016 |
| CN | 205137735 U | 4/2016 |
| CN | 106152315 A | 11/2016 |
| CN | 106949559 A | 7/2017 |
| CN | 206369283 U | 8/2017 |
| CN | 107980091 A | 5/2018 |
| CN | 109073269 A | 12/2018 |
| DE | 4230604 A1 | 3/1994 |
| EP | 0756140 A2 | 1/1997 |
| EP | 1248049 A2 | 10/2002 |
| EP | 1956307 A1 | 8/2008 |
| EP | 2063192 A1 | 5/2009 |
| EP | 2381180 A2 | 10/2011 |
| EP | 2602420 A2 | 6/2013 |
| EP | 3276279 A1 | 1/2018 |
| EP | 3312531 A1 | 4/2018 |
| FR | 755472 A | 11/1933 |
| GB | 212669 | 3/1924 |
| GB | 1239997 | 7/1971 |
| GB | 2126695 A | 3/1984 |
| JP | 54105838 A | 8/1979 |
| JP | 07248128 A | 9/1995 |
| JP | 08226745 A | 9/1996 |
| JP | 2000002474 A | 1/2000 |
| JP | 2001239121 A | 9/2001 |
| JP | 2002357338 A | 12/2002 |
| JP | 2009144984 A | 7/2009 |
| JP | 2012132640 A | 7/2012 |
| KR | 20070077917 A | 7/2007 |
| KR | 20160086637 A | 7/2016 |
| KR | 20160111687 A | 9/2016 |
| KR | 102187381 B1 | 12/2020 |
| KR | 20210077328 A | 6/2021 |
| WO | 8800676 A1 | 1/1988 |
| WO | 0190657 A1 | 11/2001 |
| WO | 2005054751 A2 | 6/2005 |
| WO | 2005116530 A1 | 12/2005 |
| WO | 2009052372 A2 | 4/2009 |
| WO | 2011079371 A1 | 7/2011 |
| WO | 2012056164 A1 | 5/2012 |
| WO | 2014188526 A1 | 11/2014 |
| WO | 2014206846 A1 | 12/2014 |
| WO | 2015098157 A1 | 7/2015 |
| WO | 2015115929 A1 | 8/2015 |
| WO | 2017001914 A1 | 1/2017 |
| WO | 2017045909 A1 | 3/2017 |
| WO | 2017045934 A1 | 3/2017 |
| WO | 2017075658 A1 | 5/2017 |
| WO | 2017194092 A1 | 11/2017 |
| WO | 2018090114 A1 | 5/2018 |
| WO | 2019114944 A1 | 6/2019 |
| WO | 2020038239 A1 | 2/2020 |

OTHER PUBLICATIONS

Notice of Allowance for U.S. Appl. No. 16/771,107, mailed Jul. 20, 2022, 9 pages.
Non Final Office Action for U.S. Appl. No. 16/771,111, mailed Sep. 8, 2022, 17 pages.
Non Final Office Action for U.S. Appl. No. 17/558,962, mailed Jun. 13, 2023, 16 pages.
Chinese Office Action for Chinese Application No. 201680028498.X, dated Sep. 4, 2019, with translation, 15 pages.
Chinese Office Action for Chinese Application No. 201680085261.5, dated Apr. 14, 2020, 11 pages.
Chinese Office Action for Chinese Application No. 201680085261.5, dated Dec. 11, 2020, with translation, 28 pages.
Chinese Office Action for Chinese Application No. 201780097448.1, dated Jun. 29, 2021, with translation, 14 pages.
Chinese Office Action for Chinese Application No. 201780097456.6, dated Jan. 6, 2021, with translation, 19 pages.
Chinese Office Action for Chinese Application No. 2016800860880, dated Jan. 26, 2021, with translation, 18 pages.
Chinese Office Action for Chinese Application No. 2016800860880, dated May 7, 2020, 8 pages.
Chinese Office Action with Search Report for Chinese Application No. 201780097448.1, dated Jan. 12, 2021, 8 pages.
Chinese Office Action with Search Report for Chinese Application No. 201780097449.6, dated Jan. 12, 2021, 8 pages.
European Communication pursuant to Article 94(3) for European Application No. 16 721 184.6, dated Oct. 7, 2020, 7 pages.
"Evidence for Common Knowledge," 2014, 6 pages.
Final Office Action for U.S. Appl. No. 16/771,111, mailed Apr. 19, 2022, 30 pages.
International Preliminary Report on Patentability for International Application No. PCT/EP2017/082610, dated Jun. 16, 2020, 5 pages.
International Preliminary Report on Patentability for International Application No. PCT/EP2017/082611, dated Jun. 16, 2020, 7 pages.
International Preliminary Report on Patentability for International Application No. PCT/EP2017/082615, dated Jun. 16, 2020, 7 pages.
International Search Report and Written Opinion for International Application No. PCT/EP2016/060396, dated Jan. 24, 2017, 9 pages.
International Search Report and Written Opinion for International Application No. PCT/EP2016/062022, dated Jan. 23, 2017—9 pages.
International Search Report and Written Opinion for International Application No. PCT/EP2016/070382, dated Dec. 1, 2016, 14 pages.
International Search Report and Written Opinion for International Application No. PCT/EP2016/070702, dated Dec. 9, 2016, 9 pages.
International Search Report and Written Opinion for International Application No. PCT/EP2017/082610, dated Aug. 21, 2018, 7 pages.
International Search Report and Written Opinion for International Application No. PCT/EP2017/082611, dated Aug. 9, 2018, 10 pages.
International Search Report and Written Opinion for International Application No. PCT/EP2017/082615, dated Aug. 9, 10 pages.
International Search Report and Written Opinion for International Application No. PCT/EP2019/083588, dated Sep. 4, 2020, 9 pages.
International Search Report and Written Opinion for International Application No. PCT/IB2016/000949, dated Nov. 2, 2016, 9 pages.
Non Final Office Action for U.S. Appl. No. 16/771,107, dated Feb. 8, 2022, 11 pages.
Non Final Office Action for U.S. Appl. No. 16/771,111, dated Dec. 21, 2021, 41 pages.
Non Final Office Action for U.S. Appl. No. 16/771,456, dated Nov. 10, 2021, 39 pages.

* cited by examiner

AIR-CONDITIONER WITH FLUID TANK

This application is a U.S. National Phase application of PCT International Application No. PCT/EP2019/083588, filed Dec. 4, 2019, which is incorporated by reference herein.

TECHNICAL FIELD

The invention relates to an air conditioner. In particular the present invention relates to a fluid tank connectable between an indoor unit and an outdoor unit of an air-conditioner.

BACKGROUND

Air conditioning is a collective expression for conditioning air into a desired state. It could be heating the air during cold periods, cooling the air during warmer periods or for cleaning the air if it contains unwanted particles. However, the expression air conditioning is most often used when emphasizing cooling. As a product, air conditioners can look and be used in various ways, but they all share the same basic technology. The air-conditioner comprises a compressor, a condenser, an evaporator, and typically also an expansion device.

There are different types of air-conditioners. One type of air-conditioner can be referred to as a split air-conditioner. In a split air conditioner, the condenser and the evaporator are located in two different separated units that are interconnected via pipes to circulate a refrigerant from one unit to the other.

Another type of air-conditioner can be referred to as Packaged Air Conditioner. A Packaged Air Conditioner (AC) can be said to be a type of self-contained system, in which all the cooling cycle components, such as the compressor, condenser, expansion device, evaporator and control system are enclosed in a single package. Among the packaged systems, the most commonly used for residential applications are the Window-type ACs, Packaged Terminal AC's (PTAC), and also Portable AC units.

The Packaged Air Conditioner has the advantages of easy installation, relatively small footprint, flexibility for heating/cooling individual rooms and low cost.

In contrast, Split Air Conditioners comprise at least two factory-made separated assemblies, designed to be used together. In a split system, the outdoor unit is separated by some distance from the indoor one(s) by means of semi rigid pipes which contain the refrigerant (at high pressure) that produces the cooling/heating effect in the system. Among other advantages, split systems can provide high efficiency ratios in a wide range of capacities and working conditions. Additionally, in split AC systems, the compressor, outdoor heat exchanger and outdoor fan can be located further away from the inside space, rather than merely on the other side of the same unit (as in PTACs or window air conditioners), achieving lower indoor noise levels.

When installing an air-conditioner having an outdoor unit, such as a split air conditioner or a similar type of air conditioner, installation is often difficult and requires licensed personnel. This is, at least in part because the refrigerant used in most air-conditioners is hazardous. However, some systems allow for the use of non-hazardous fluids in the air-conditioner. In such air-conditioners any person can be allowed to perform installation and maintenance. Thus, the term non-hazardous is used herein to define a fluid legal to be handled by an un-licensed person. PCT/EP/2017082610 describes an exemplary air-conditioner capable of using a non-hazardous fluid to exchange/transfer heat between an indoor unit and an outdoor unit of an air-conditioner.

There is a constant desire to improve air conditioners. Hence, there exists a need for an improved air conditioner and in particular an improved mechanism for installation and maintenance of air-conditioners.

SUMMARY

It is an object of the present invention to provide an improved air-conditioner and in particular an improved device for use in an air-conditioner.

This object is obtained by a device as set out in the appended claims.

In accordance with the invention a fluid tank configured to connect an indoor unit of an air-conditioner with an outdoor unit of the air-conditioner is provided. The fluid tank comprises a first chamber and a second chamber. The first chamber comprises a high-pressure inlet and a high-pressure outlet. The second chamber comprises a low-pressure inlet, a low-pressure outlet and a low-pressure filling opening. Hereby a connection device can be obtained that facilitates installation of an air-conditioner. The connection device formed by the fluid tank allows for easy filling of heat transfer fluid in the air-conditioner and easy removal of air from the circulating heat transfer fluid system of the air-conditioner.

In accordance with one embodiment, the first chamber comprises a high-pressure filling opening. Hereby filling of heat transfer fluid can be performed also on the high-pressure side of the heat transferring fluid system.

In accordance with one embodiment, a top section of the fluid tank is inclined and the high-pressure filling opening and or low-pressure filling opening are located at a top portion of the inclined top section. Hereby air in the circulating heat transfer fluid system of the air-conditioner can be caught in the top section and because the filling opening(s) are located at the top air can easily be removed from the circulating heat transfer fluid system of the air-conditioner.

In accordance with one embodiment, the high-pressure inlet, the high-pressure outlet the low-pressure inlet, and the low-pressure outlet are located on side walls of the fluid tank. Hereby, the fluid tank can be easy to fit to connectors of the circulating fluid system of the air-conditioner.

In accordance with one embodiment, at least one of the high-pressure inlet, the high-pressure outlet the low-pressure inlet, and the low-pressure outlet is inclined in relation to a bottom portion of the fluid tank. For example, the inlets/outlets can point slightly in a direction downwards (towards the bottom portion). Hereby the fitting to connectors of the circulating fluid system of the air-conditioner can be further facilitated. The high-pressure inlet, the high-pressure outlet the low-pressure inlet, and the low-pressure outlet can in some embodiments be provided with quick connectors to further facilitate installation of the fluid tank.

In accordance with one embodiment, at least one of the first chamber and the second chamber is provided with a purge valve. The purge valve be provided on a cap of a filling opening. The purge valve can in one embodiment be provided on the first, high pressure, chamber. Hereby air-removal from the circulating fluid system of the air-conditioner can be made easier.

The invention also extends to an air conditioner comprising an indoor unit and an outdoor unit, where a non-hazardous fluid is circulated between the indoor unit and the outdoor unit in a circulation system, and where the air conditioner comprises a fluid tank according to the above in the fluid path of the non-hazardous fluid circulated between the indoor unit and the outdoor unit. The fluid tank can be configured to be installed at a highest position of the fluid path of the non-hazardous fluid circulated between the indoor unit and the outdoor unit.

The fluid circulated between the indoor unit and the outdoor unit can be a water-based fluid or an alcohol or some other fluid legally handled be any person such that no special license or permit is required to install the air-conditioner.

BRIEF DESCRIPTION OF THE DRAWINGS

The invention will now be described in more detail, by way of example, and with reference to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those skilled in the art. For example, like or similar components of different embodiments can be exchanged between different embodiments. For example, an air conditioner can be described herein as a cooling system, but the cooler can equally be a heater if the system is run in a heating mode. Some components can be omitted from different embodiments. Like numbers refer to like elements throughout the description.

As has been realized by the inventor, air-conditioners of a split type are difficult and often expensive to install. Also, maintenance can be difficult to perform.

Figure 1:
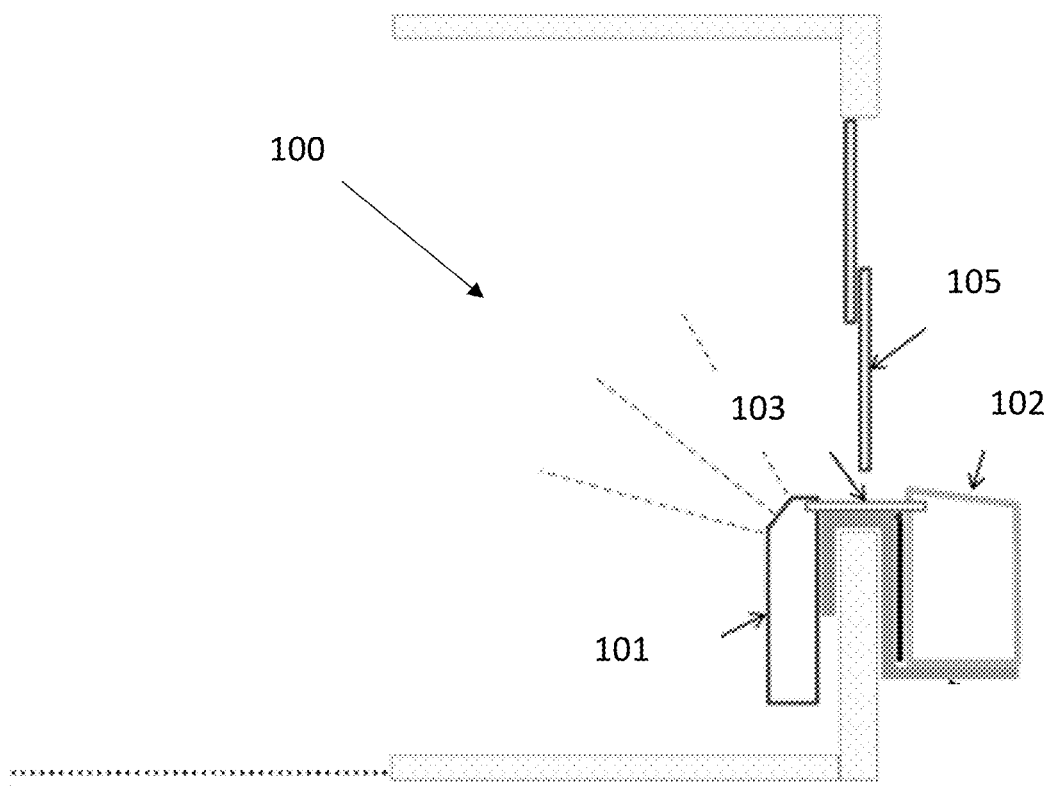
FIG. 1 shows a general view of an air-conditioner installation through a window opening.

Below a description of an air-conditioner of a split type is given. The description with reference to FIG. 1 is given for providing a context to better understand the benefits of the invention. FIG. 1 illustrate a Monoblock Air Conditioners (mini-chiller)/Monoblock heat pump that transfer energy between Indoor and Outdoor via a fluid, typically water. In some installations a short water loop is connected to a fan coil that cools air using cold water directly from an outdoor heat pump unit of an air-conditioner 100.

FIG. 1 shows a schematic diagram of an embodiment of an air-conditioner 100. The air-conditioner 100 can be said to be of a split type comprising an indoor unit 101 and an outdoor unit 102. The units 101, 102 are interconnected via an intermediate circulation system 103 for circulating a fluid, between the indoor unit 101 and the outdoor unit 102. Also depicted is a window 105 where the air-conditioner 100 is installed.

The circulating system 103 used to transfer heat between the indoor unit 101 system can be a low-pressure system it can use an energy transport media that is easy to handle, such as water a water-based solution, or some other liquid media such as ethanol. In particular any non-hazardous liquid can be used in the circulation system 103.

Figure 2:
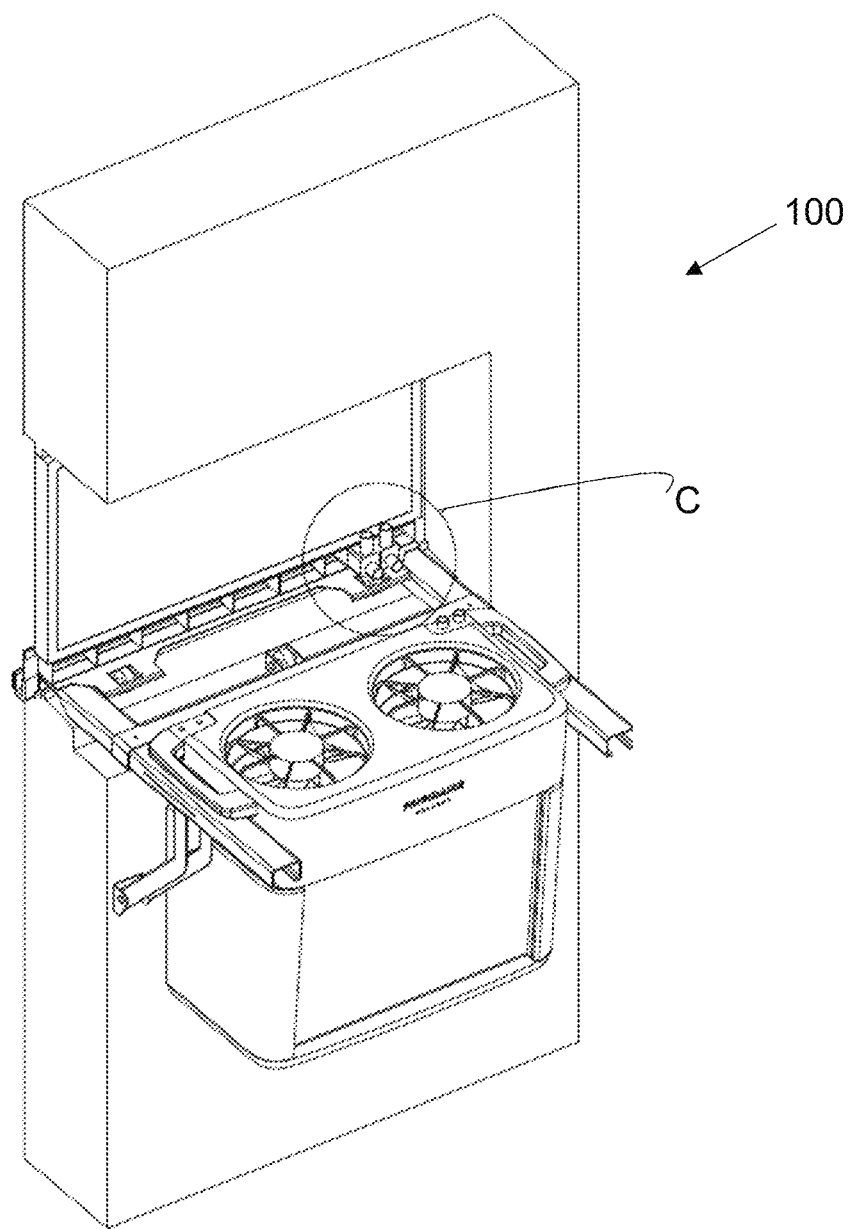
FIG. 2 is a view in perspective of an air-conditioner installed in a window opening.

In FIG. 2 the air-conditioner 100 is depicted in a perspective view from the outside of the window. In FIG. 2 an area C is marked.

Figure 3:
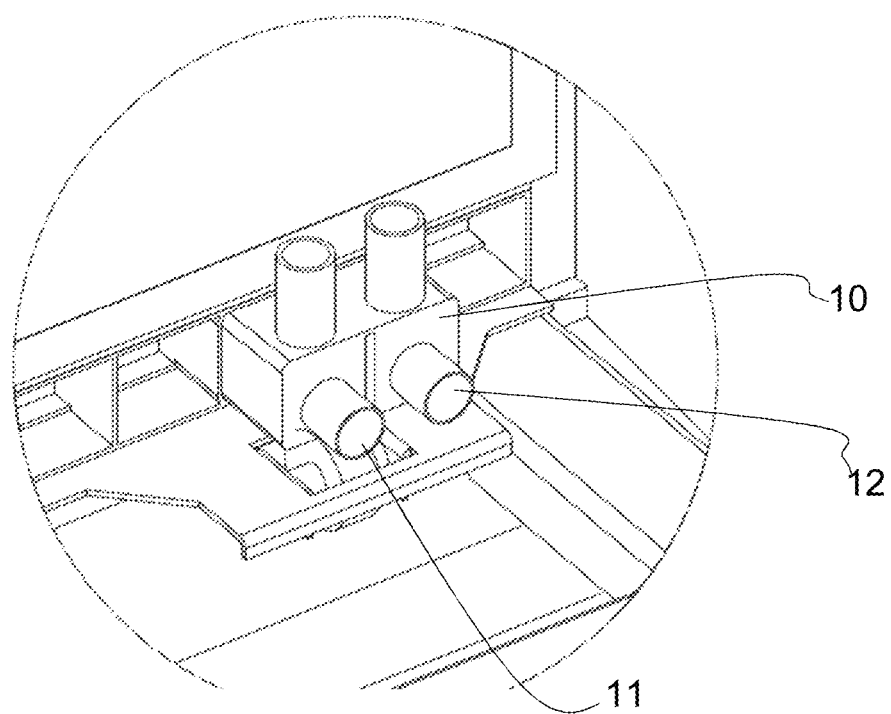
FIGS. 3 and 4 show a fluid tank of an air-conditioner installation.

FIG. 3 is a view of the area C of FIG. 2 from the outside. FIG. 3 depicts a part of the circulation system 103 with a fluid tank 10 located in the circulating system 103. It is to be noted that the view of FIG. 3 is shown with the circulation system disconnected from the fluid tank 10. The fluid tank 10 has an inlet 11 and an outlet 12 that can be connected to the circulation system.

Figure 4:
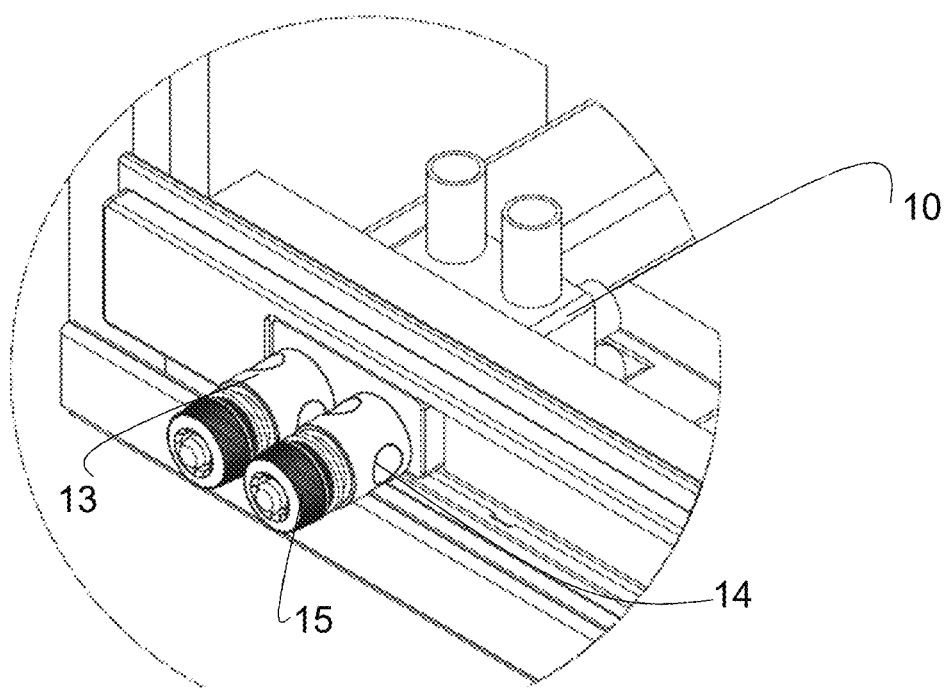

FIG. 4 is a view similar to the view in FIG. 3. In FIG. 4 the fluid tank is shown from the inside. Here the inlet 13 and outlet 14 from the inside of the fluid tank 10 are provided with quick connectors 15. Quick connectors 15 can be provided on any one of the inlets/outlets of the fluid tank 10. Thus, it is envisaged that quick connectors can also be provided on the inlet 11 and or the outlet 12.

Figure 5:
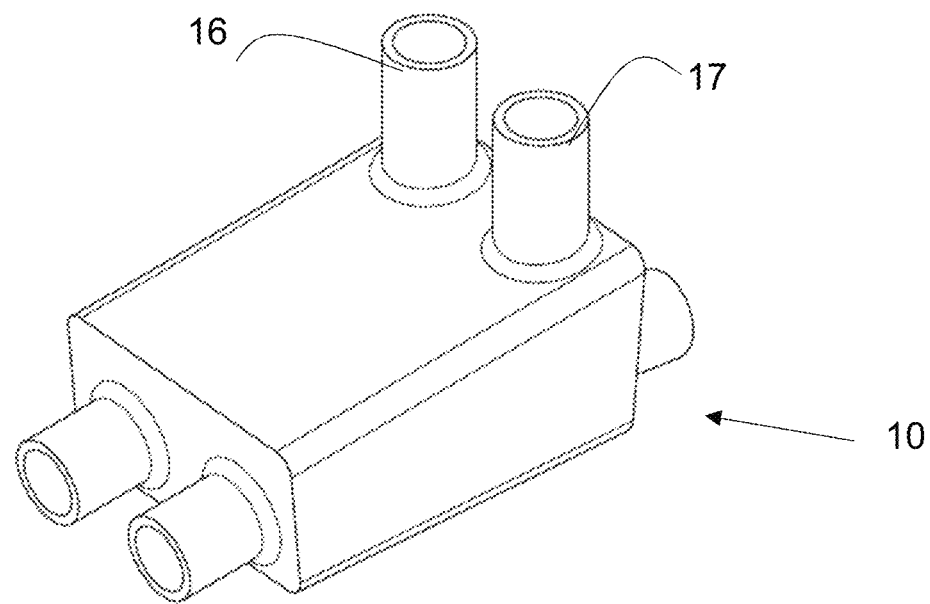
FIG. 5 is a view in perspective of a fluid tank.

In FIG. 5 the fluid tank 10 is shown in perspective removed from the air-conditioner 100. The fluid tank 10 comprises at least one filling opening 16, 17. The filling opening 16 in FIG. 5 is provided in a low-pressure side of the circulation system. A filling opening 17 can also be provided in a high-pressure side of the circulating system.

To elaborate, with the pump off—the pressure in the fluid loop of the circulating system and the fluid tank is atmospheric pressure. However, when the pump used to circulate fluid in the loop (of which the fluid tank is a part) is started, it sucks fluid in and discharges it on the other side. As a side-effect; the tank chamber that is on the discharge side is pressurized. The tank chamber on the suction side is underpressure. Thus, the pressure in the discharge side will have a high pressure compared to the suction side. The terms high-pressure and low-pressure are used herein to reflect this. The pressure difference is caused by the pump pushing fluid through the heat exchanger (pressure drop). A purge valve on the high-pressure side can be used to remove air when the pump is running—because there is a pressure to "push" the air out.

Figure 6:
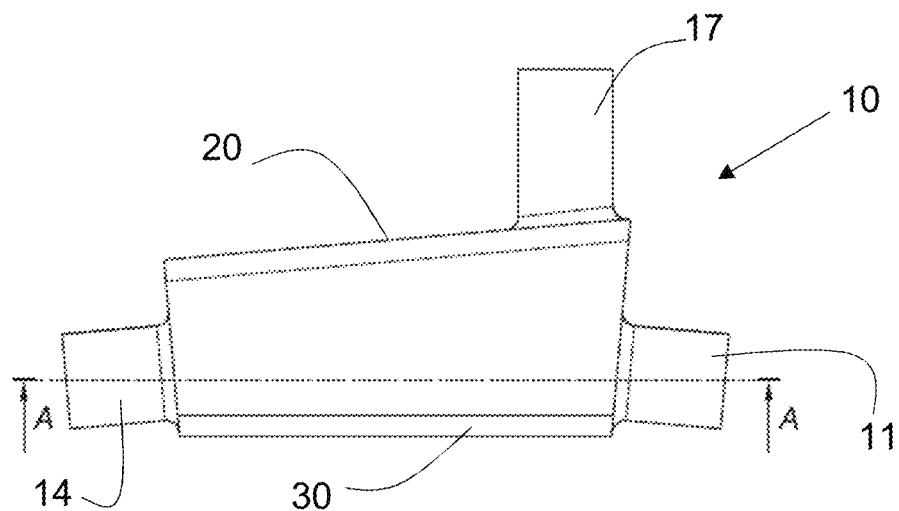
FIG. 6 is a side view of a fluid tank.

In FIG. 6 a side view of the fluid tank 10 is shown. A top section 20 of the fluid tank 10 is inclined. The high-pressure filling opening 17 and or low-pressure filling opening 16 are in some embodiments located at a top portion of the inclined top section 20. The high-pressure inlet 11, the high-pressure outlet the low-pressure inlet, and the low-pressure outlet are located on side walls of the fluid tank 10. In accordance with some embodiments at least one of the high-pressure inlet 11, the high-pressure outlet 14, the low-pressure inlet 13, and the low-pressure outlet 12 is inclined in relation to a bottom portion 30 of the fluid tank 10. For example, the inlets/outlets can point slightly in a direction downwards (towards the bottom portion). The inclination can for example be achieved by letting the side walls of the fluid tank 10 be inclined (not being in a 90-degree angle) with respect to the bottom portion 30. In another embodiment the inlets/outlets can be arranged inclined with respect to the side walls of the fluid tank.

Figure 7:
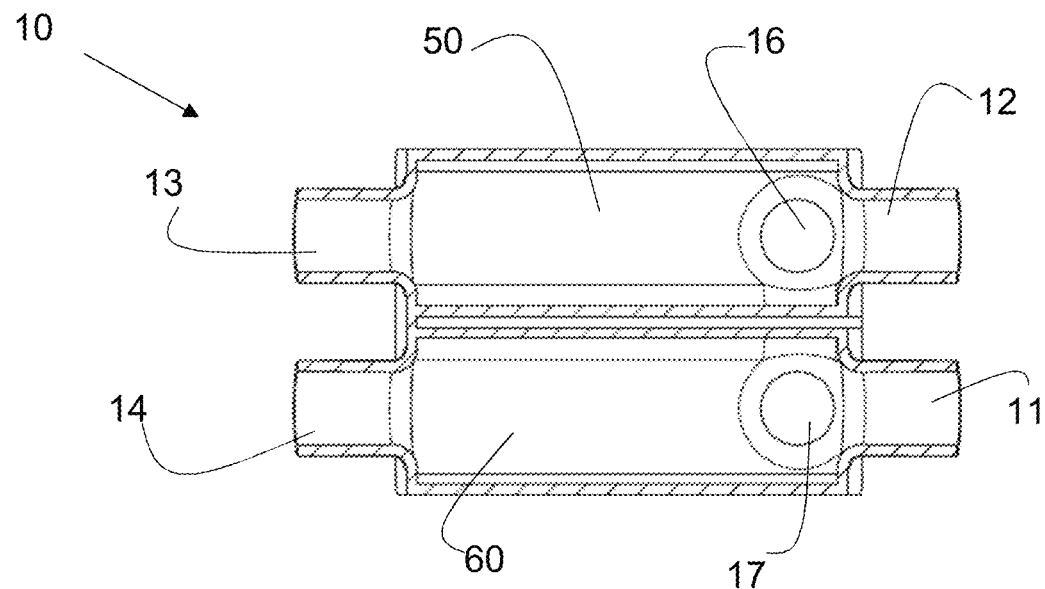
FIG. 7 is a cross-sectional view of a fluid tank.

In FIG. 7 a cross-sectional view along the section A-A of FIG. 6 is shown. In FIG. 7 the two chambers 50 and 60 inside the fluid tank are shown. A first chamber 60 can be the high-pressure side of the circulating system and the second chamber 50 can be the low-pressure side of the circulating system. For example, the first chamber 60 can be a high-pressure chamber that takes the water (or some other suitable fluid) discharged from a pump which causes pressure buildup. The pressure forces water out of the first chamber 60. The second chamber 50 is a low-pressure chamber from which the pump sucks water out causing a low pressure. The low-pressure sucks water out of second chamber 50. In the embodiment of FIG. 7 a filling opening is provided both on the high-pressure side and on the low-pressure side.

Figure 8:
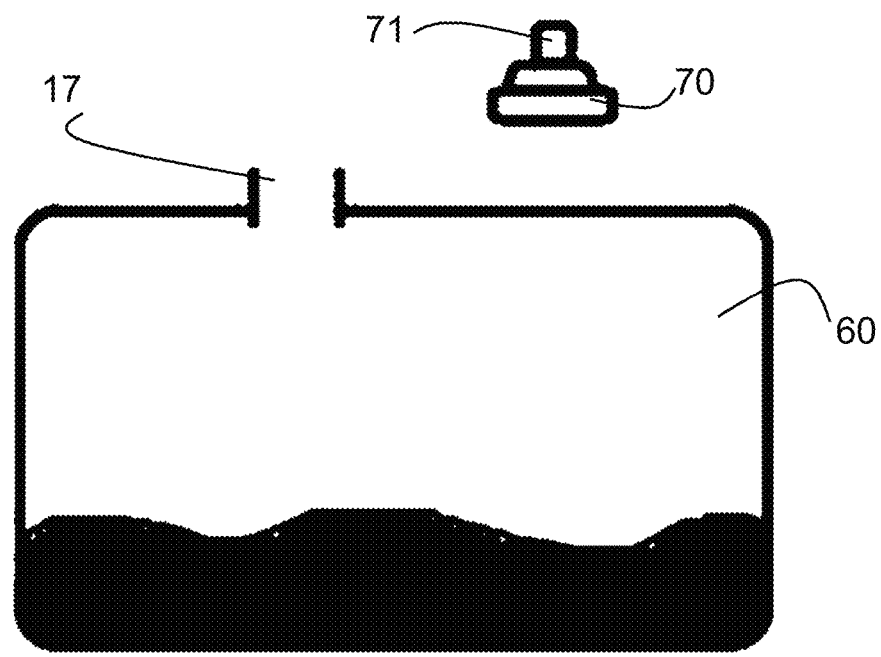
FIG. 8 is a cross-sectional view from the side of a chamber partly filled with fluid with a cap removed from the filling opening.

In addition, a purge valve can be provided to further facilitate removal of air from the circulating system. In some embodiments a purge valve per chamber 50, 60 can be provided. In one embodiment the purge valve is provided on at least one of the caps of the filling opening(s) 16, 17. In FIG. 8, the high-pressure chamber 60 is shown in acrosssectional view from the side with a cap 70 removed from the high-pressure filling opening. On the bottom of the chamber 60 fluid is present. On top of the water air is present. The cap 70 is in the embodiment of FIG. 8 provided with a purge valve 71. When the cap 70 is put in place, air can exit the chamber 60 via the purge valve 71.

When in use the air-conditioner 100 can be operated as follows when filling the circulating system with water (or other fluid). The fluid tank can preferably be placed at a highest position in the circulating system of the air-conditioner. For example, if the air-conditioner is placed in a window sill as depicted in FIG. 1 the fluid tank can be attached to the windowsill and connected to the circulating system via the inlet and outlet openings of the fluid tank. The filling opening or openings depending on implementation of the fluid tank can then be opened. Water is filled slowly through the opening(s), until water almost overflows. The high-pressure filling opening, if present is then closed and the pump of the circulating system is started. The water level of in the low-pressure chamber then lowers. In accordance with some embodiments the pump of the circulating system can then be cycled on/off. As this process continues air in the circulating system will enter the chambers and can exit the circulating system via the filling opening of the low-pressure side and or via a purge valve. When the water level drops in the low pressure chamber more water can be filled until the water level no longer drops. Then the filling opening of the low-pressure chamber can be closed. The circulating system is now filled with no air therein. If a purge vale is present air that for some reason enters the system can be removed via the purge valve. If no purge valve is present air can be removed be filling water in the filling opening in the same manner as when first filling up the circulating system as a top up filling.

Using the fluid tank as described herein allows for easy filling of a circulating system of an air-conditioner. At the same time the fluid tank allows for easy removal of air from the circulating system.

The invention claimed is:

1. A fluid tank configured to connect an indoor unit of an air-conditioner with an outdoor unit of the air-conditioner, the fluid tank comprising
   a first chamber,
   a second chamber,
   the first chamber comprising a high-pressure inlet and a high-pressure outlet,
   the second chamber comprising a low-pressure inlet, a low-pressure outlet and a low-pressure filling opening,
   wherein the first and second chambers are configured to circulate a fluid between the indoor and outdoor units.

2. The fluid tank according to claim 1, wherein the first chamber comprises a high-pressure filling opening.

3. The fluid tank according to claim 2, wherein a top section of the fluid tank is inclined and wherein the high-pressure filling opening and or low-pressure filling opening are located at a top portion of the inclined top section.

4. The fluid tank according to claim 1, wherein the high-pressure inlet, the high-pressure outlet, the low-pressure inlet, and the low-pressure outlet are located on side walls of the fluid tank.

5. The fluid tank according to claim 4, wherein at least one of the high-pressure inlet, the high-pressure outlet the low-pressure inlet, and the low-pressure outlet is inclined in relation to a bottom portion of the fluid tank.

6. The fluid tank according to claim 1, wherein at least one of the high-pressure inlet, the high-pressure outlet the low-pressure inlet, and the low-pressure outlet is provided with quick connectors.

7. The fluid tank according to claim 1, wherein at least one of the first chamber and the second chamber is provided with a purge valve.

8. An air conditioner comprising:
   an indoor unit;
   an outdoor unit;
   a circulation system for a fluid circulating between the indoor unit and the outdoor unit; and
   a fluid tank in the fluid path of the fluid circulating in the circulation system, the fluid tank comprising:
   a first chamber,
   a second chamber,
   the first chamber comprising a high-pressure inlet and a high-pressure outlet,
   the second chamber comprising a low-pressure inlet, a low-pressure outlet and a low-pressure filling opening.

9. The air-conditioner according to claim 8, wherein the fluid tank is located at a highest position of the fluid path of the fluid circulated between the indoor unit and the outdoor unit.

10. The air-conditioner according to claim 8, wherein the fluid circulated between the indoor unit and the outdoor unit is a water-based fluid or an alcohol.

11. The air-conditioner according to claim 8, wherein the first chamber comprises a high-pressure filling opening.

12. The air-conditioner according to claim 11, wherein a top section of the fluid tank is inclined and wherein the high-pressure filling opening and or low-pressure filling opening are located at a top portion of the inclined top section.

13. The air-conditioner according to claim 8, wherein the high-pressure inlet, the high-pressure outlet, the low-pressure inlet, and the low-pressure outlet are located on side walls of the fluid tank.

14. The air-conditioner according to claim 13, wherein at least one of the high-pressure inlet, the high-pressure outlet the low-pressure inlet, and the low-pressure outlet is inclined in relation to a bottom portion of the fluid tank.

15. The air-conditioner according to claim 8, wherein at least one of the high-pressure inlet, the high-pressure outlet the low-pressure inlet, and the low-pressure outlet is provided with quick connectors.

16. The air-conditioner according to claim 8, wherein at least one of the first chamber and the second chamber is provided with a purge valve.

17. A fluid tank configured to connect an indoor unit of an air-conditioner with an outdoor unit of the air-conditioner, the fluid tank comprising:
- a first chamber comprising a high pressure inlet, a high pressure outlet, and a high pressure filling opening; and
- a second chamber comprising a low pressure inlet, a low pressure outlet, and a low pressure filling opening,
- wherein the first and second chambers are configured to circulate a fluid between the indoor and outdoor units, and wherein the fluid is water, a water-based solution, or an alcohol.

18. The fluid tank of claim 17, wherein the high-pressure filling opening and/or low-pressure filling opening is located at a top section of the fluid tank.

19. The fluid tank of claim 18, wherein the high-pressure inlet, the high-pressure outlet, the low-pressure inlet, and the low-pressure outlet are located on side walls of the fluid tank.

20. The fluid tank of claim 17, wherein at least one of the first and second chambers is provided with a purge valve.

* * * * *